United States Patent [19]
Shoroff et al.

[11] Patent Number: 5,983,240
[45] Date of Patent: *Nov. 9, 1999

[54] METHOD AND SYSTEM OF CONVERTING DATA FROM A SOURCE FILE SYSTEM TO A TARGET FILE SYSTEM

[75] Inventors: Srikanth Shoroff, Issaquah; Bartosz Boleslaw Milewski, Seattle, both of Wash.

[73] Assignee: Microsoft Corporation, Redmond, Wash.

[*] Notice: This patent is subject to a terminal disclaimer.

[21] Appl. No.: 09/064,027

[22] Filed: Apr. 21, 1998

Related U.S. Application Data

[63] Continuation of application No. 08/573,479, Dec. 15, 1995, Pat. No. 5,742,818.

[51] Int. Cl.⁶ .................................................. G06F 17/30
[52] U.S. Cl. .................. 707/200; 707/101; 707/201; 707/205
[58] Field of Search ................................ 707/200, 201, 707/205, 101

[56] References Cited

U.S. PATENT DOCUMENTS

| | | | |
|---|---|---|---|
| 5,349,657 | 9/1994 | Lee | 395/712 |
| 5,481,714 | 1/1996 | Pipkin et al. | 395/700 |
| 5,513,351 | 4/1996 | Grantz | 395/616 |
| 5,678,044 | 10/1997 | Pastillha et al. | 707/104 |
| 5,875,331 | 2/1999 | Lindsey | 395/702 |

OTHER PUBLICATIONS

Yao, "Windows 32–bit API Gives Developers advanced operating system capabilities", Microsoft Systems Journal, vol. 6, Nov.–Dec., 1991, pp. 15–23.
Kent, "The Basis For Technical Superiority", Info World, vol. 15, No. 21, May 24, 1993, pp. 79–81.
Streeter, "Move Over Novell: NT Server Gains Converts", MacWEEK, vol. 9, No. 45, Nov. 13, 1995, pp. 26–27.
Louderback et al., "Windows 95 and NT face Off", Windows Sources, vol. 4, No. 1, Jan., 1996, pp. 164–176.
User's Guide, Microsoft MS–DOS 6 for the MS–DOS Operating System, pp. 124–125, 1993, Microsoft Corporation.
Installation Guide, Microsoft Windows NT Server, 1994.

*Primary Examiner*—Paul R. Lintz
*Attorney, Agent, or Firm*—Leydig, Voit & Mayer, Ltd.

[57] ABSTRACT

A method for converting a source file system to a target file system while maintaining data integrity is disclosed. Calls to the target file system are used to convert the files in the source file system to files in the target file system. After creating a minimal target file system by placing data structures for the target file system on the disk, the data structures, directories and file data for the source file system are stored in a new file on the target file system. Data associated with the files from the source file system are parsed out of the new file and provided to the target file system to create files on the target file system, thereby completing the conversion.

18 Claims, 7 Drawing Sheets

Entire FAT Data in a Single File

FAT Partition After Compaction

Intermediate State When OFS Data Structures are Being Created

Entire FAT Data in a Single File

Old FAT Chain

New FAT Chain

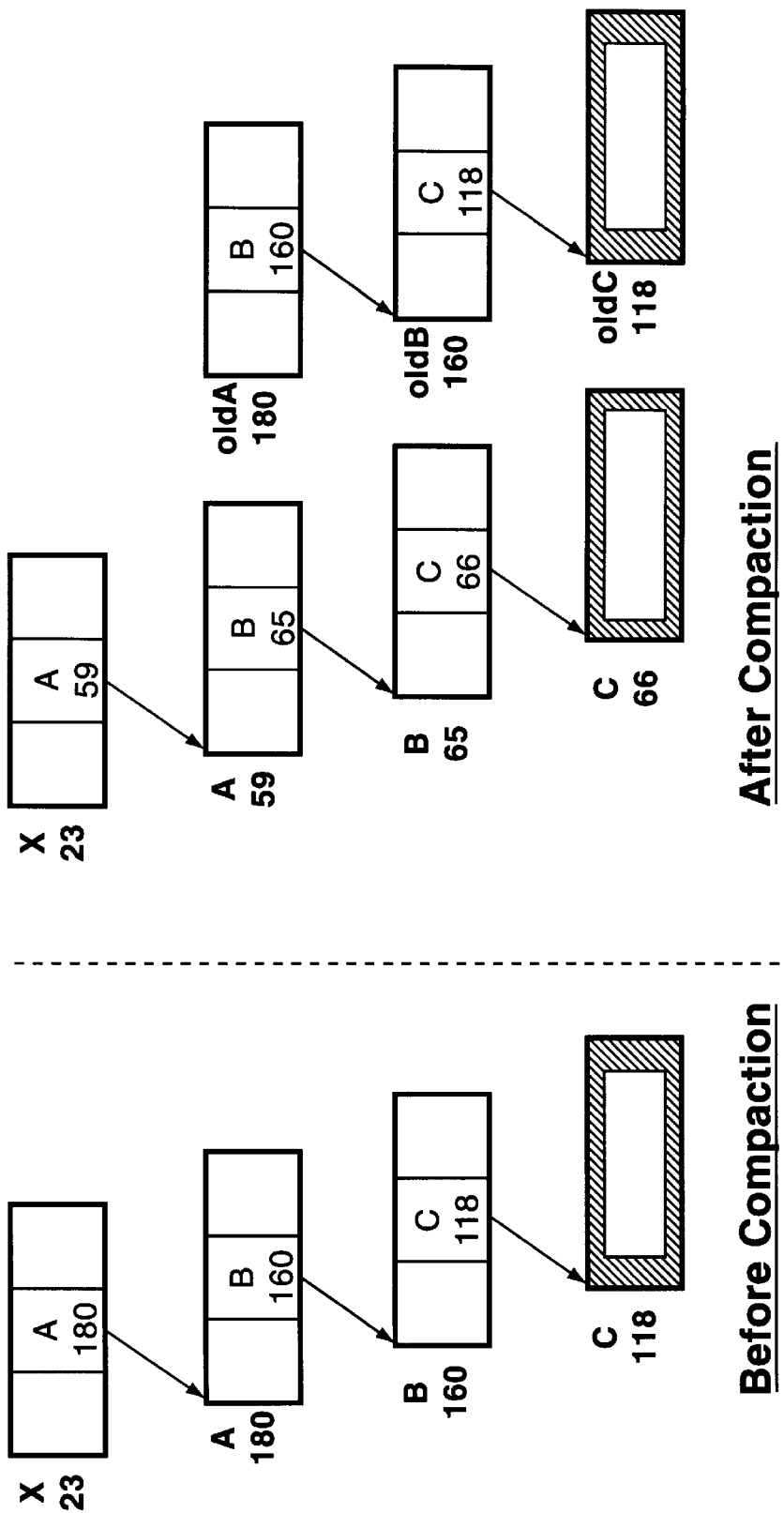
FIG. 9b After Compaction
FIG. 9a Before Compaction

METHOD AND SYSTEM OF CONVERTING DATA FROM A SOURCE FILE SYSTEM TO A TARGET FILE SYSTEM

This application is a continuation of application Ser. No. 08/573,479, filed Dec. 15, 1995, now U.S. Pat. No. 5,742,818.

FIELD OF THE INVENTION

The present invention relates to file system management, and more particularly to a method and system for converting files from a source file system to a target file system.

BACKGROUND OF THE INVENTION

File systems are primarily concerned with the overall management of files in a computer system. Among other things, file systems generally contain methods for (1) providing for files to be stored, referenced, shared and secured; (2) accessing data stored in files; and (3) maintaining file integrity to ensure that the information in a file remains uncorrupted.

One file system, which is used in the MS-DOS operating system, uses a File Allocation Table (FAT table) to assist in the performance of the above-described functions. This FAT file system requires a large number of sectors at the beginning of the disk for holding FAT meta data structures such as the boot sector, the FAT table and the Root directory. The FAT file system manages files by grouping the sectors or areas on the disk into a finite set of clusters or allocation units. Each cluster is assigned a number, or a FAT entry, which corresponds to its position on the disk.

In practice, a FAT file can be distributed over several clusters which may or may not be contained in the same or consecutive sectors on the disk. To read or access a file, the FAT file system checks the FAT to find all the clusters associated with the file. Conversely, to write or store a new file, the FAT file system checks the FAT to find clusters which are available on the disk. For backup and other purposes, duplicate copies of the FAT table are maintained by the FAT file system (i.e., a primary FAT table and a backup FAT table).

In the FAT file system, clusters are fixed in size and represent the smallest possible storage unit on a disk. Since each file wastes one half of a cluster on average, it is beneficial to keep cluster size small to efficiently conserve disk space. However, in the FAT file system, clusters are only addressable using a 16 bit address, and accordingly, there are a limited number of clusters available. As a result, as the disk size grows, so does the cluster size.

Many other file systems have been developed since the FAT file system. One such system is the OFS file system. OFS differs from the FAT file system in several ways. First, OFS uses only a small number of sectors to hold its primary meta data. Second, OFS uses 32 bits for clusters which allow a large number of clusters. Third, OFS uses a variety of complex data structures allowing "sparse" files (i.e. files in which some sections have holes or contain no data).

As new files systems are developed, users often wish to convert to the newer file systems to take advantage of the new file systems' capabilities. For example, users may wish to convert from the FAT file system to the OFS file system. However, converting from one file system to another is typically a non-trivial procedure which often involves a significant amount of user time and an ever present danger of losing file integrity and data.

Several prior art procedures have been developed to convert files from one file system (a source file system) to another file system (a target file system). One procedure entails 1) backing up the hard disk which contains the source file system, 2) formatting the hard disk with the target file system, and 3) restoring the individual files onto the target file system. While workable, the above procedure has certain drawbacks and deficiencies. A major drawback in the above procedure is that it is time consuming from a user standpoint. Backing up, formatting and restoring an entire hard disk usually requires a substantial amount of user participation and a substantial amount of down-time for the system. Further, this procedure requires an auxiliary backup mechanism to be available, such as a magnetic tape drive with magnetic tape or a floppy disk drive with a set of disks. The latter method of using a floppy disks is not viable to backup large hard disks.

Another procedure entails an on-the-fly-conversion of the file system which converts the file system without requiring the hard disk to be reformatted. This type of conversion has been used to convert files from the FAT file system to Windows NT™ NTFS and has also been used to convert files from the OS/2 file system HPFS to Windows NT™ NTFS. In this procedure, a conversion program typically analyzes each of the files on the source file system and creates the appropriate target file data structure information, i.e. meta data, for the files. This target file meta information, which includes pointers to all of the individual files in the source file system, is necessary for the target file system to access and maintain the files. After the target file meta information is verified, the boot record is updated to point to the new meta data, thereby completing the conversion of the disk to the target file system.

A major problem associated with on-the-fly conversion methods is that the conversion program must know the detailed intricacies of both the source file system and the target file system. As a result, the conversion programs are typically large and complex, difficult to code and difficult to maintain as changes in the source or target file systems necessitate corresponding changes to the conversion program. If the conversion program does not have all the capabilities of the target file system, the conversion program may not be utilizing all of the benefits of the target file system. Of course, a more serious danger of losing data integrity may also exist.

SUMMARY OF THE INVENTION

Accordingly, a general object of the present invention is to provide a method and system for efficiently and reliably converting data from a source file system to a target file system.

Another general object of the present invention is to simplify the programming necessary for converting a disk from a source file system to a target file system.

An additional object of the present invention is to convert a disk from a source file system to a target file system without requiring backing up the source file system on an auxiliary peripheral storage device or requiring a large amount of free space to be available on the disk.

Still another object of the present invention is to convert from a source file system to a target file system while maintaining data integrity and the ability to recover from errors at any stage in the conversion process.

Yet still another object of the present invention is to restart and continue the conversion process without any loss of data even after the process has been interrupted by an unexpected failure.

The foregoing and other objects are, in one embodiment of the present invention, embodied in an improved method and system for converting from a source file system to a target file system. This method differs from other prior art methods and systems by, among other things, extensively using the target file system's capabilities, including the file creation capability. In accordance with one aspect of the present invention, the conversion is achieved by 1) creating, in the free space of the source file system, the minimal data structures necessary for operating the target file system, 2) creating at least one conversion file in the target file system which contains all the files of the source file system, 3) updating the boot information of the disk to complete the conversion of the disk to the target file system, and 4) using the data contained in the conversion file(s) and the capabilities of the target file system to create new files in the target file system.

An advantage to the present invention includes the simplification of the conversion process. By utilizing the target file system's capabilities, the present invention uses Less code and is less prone to error during the conversion process.

Other objects and advantages will become apparent from the following detailed description when taken in conjunction with the attached drawings. Moreover, while the invention will be described in connection with certain preferred embodiments, it is not intended that the invention be limited to those specific embodiments but rather that it be accorded a broad scope commensurate with the appended claims, consistent with the prior art.

BRIEF DESCRIPTION OF THE DRAWINGS

FIGS. 9a and 9b are block diagrams showing the pointers for a directory on the hard disk before and after compaction, respectively.

DETAILED DESCRIPTION OF THE PREFERRED EMBODIMENTS

Figure 1:
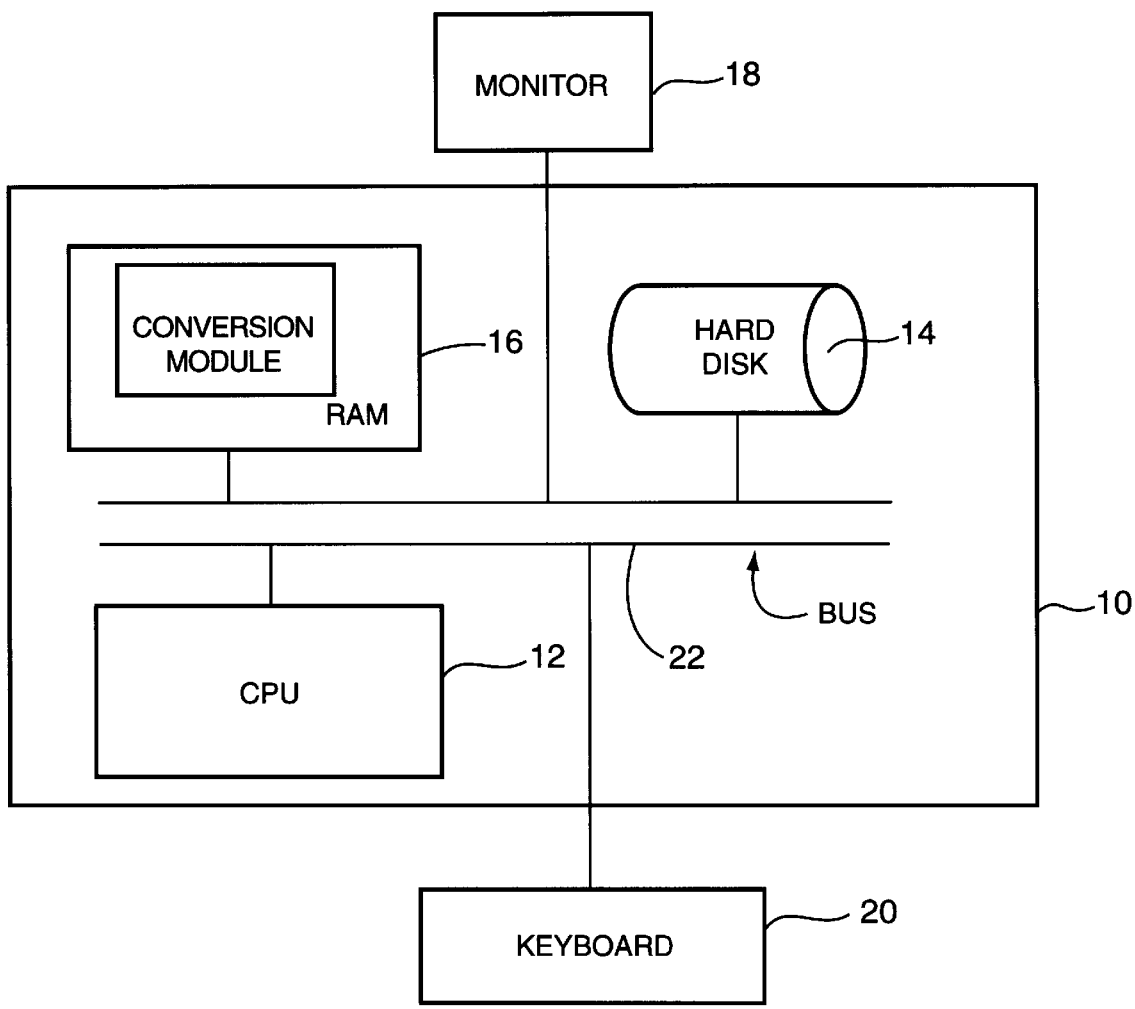
FIG. 1 is a block diagram of a computer system which is suitable for implementing a preferred embodiment of the present invention.

Referring to FIG. 1, there is shown a standard computer system 10 which is suitable for implementing a preferred embodiment of the present invention. The computer system consists generally of a central processing unit (CPU) 12, a permanent storage facility such as a hard disk 14, a temporary storage facility such as random access memory (RAM) 16, a monitor 18, a keyboard 20, and an internal data bus structure 22. In a preferred embodiment of the present invention, the hard disk 14 initially maintains and stores files using the FAT file system.

Figure 2:
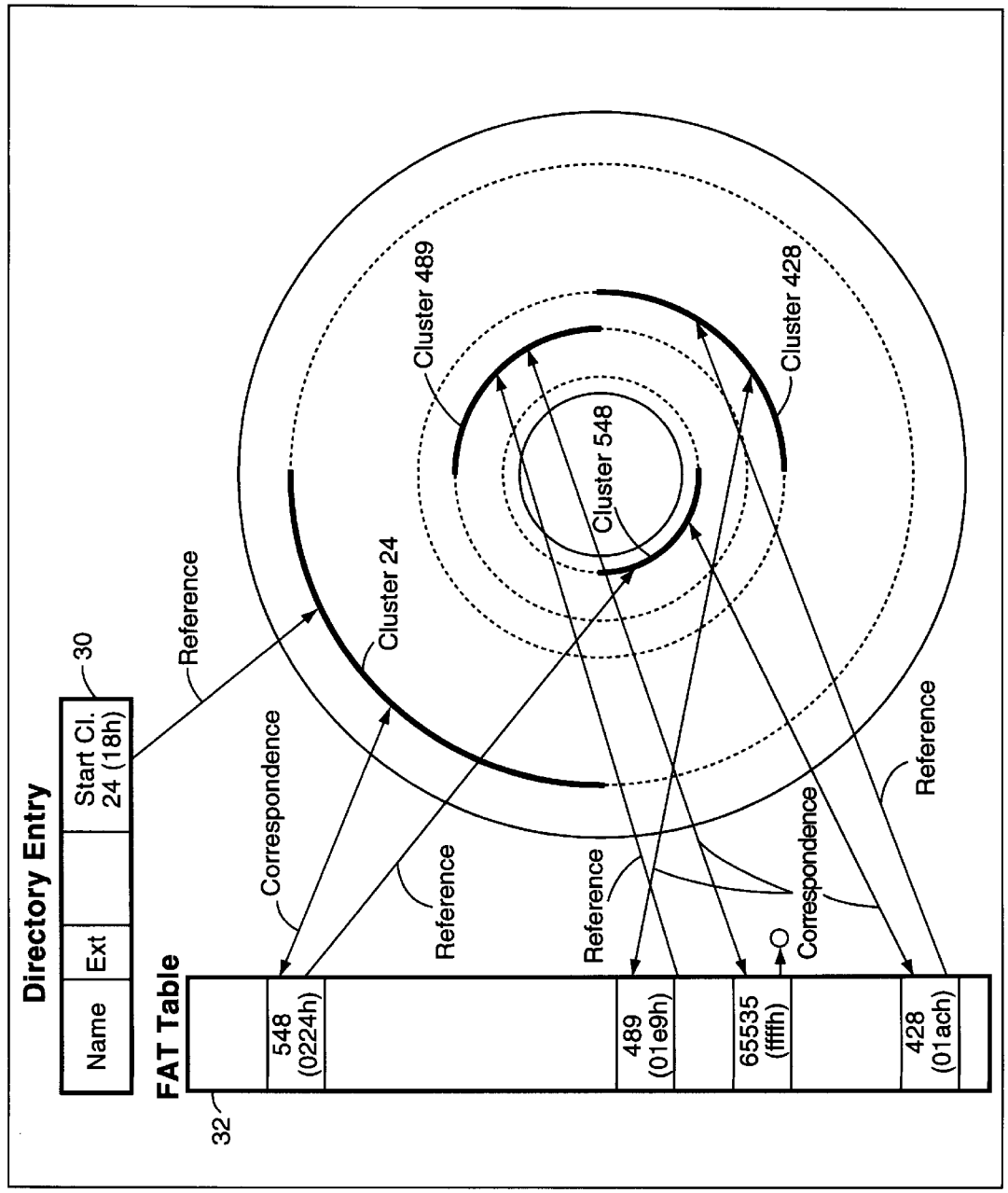
FIG. 2 is a diagram showing an example of the physical layout of a file on a FAT hard disk, such as the hard disk shown in FIG. 1.

Files in the FAT file system are comprised of chains of one or more clusters. For example, FIG. 2 shows the physical locations of four nonconsecutive clusters (clusters 24, 548, 428 and 489) which comprise a file named autoexec.bat. For each file in the FAT file system, a directory entry is provided which maintains, among other things, a pointer to the first cluster in the chain. In FIG. 2, the directory entry 30 for autoexec.bat points to starting cluster 24. The FAT table 32 contains FAT entries which are allocated for every cluster on the disk. For each cluster which makes up the file, the FAT entry provides a pointer to the next cluster in the chain. Accordingly, the FAT entry for cluster 24 contains a pointer to cluster 548 which is the next cluster in the chain comprising the file autoexec.bat. Similarly, the FAT entry for clusters 548 and 428 point to next clusters 428 and 489, respectively. Since cluster 489 is the last cluster in the chain, the FAT entry for cluster 489 points to an end of file marker (EOF).

Figure 3:
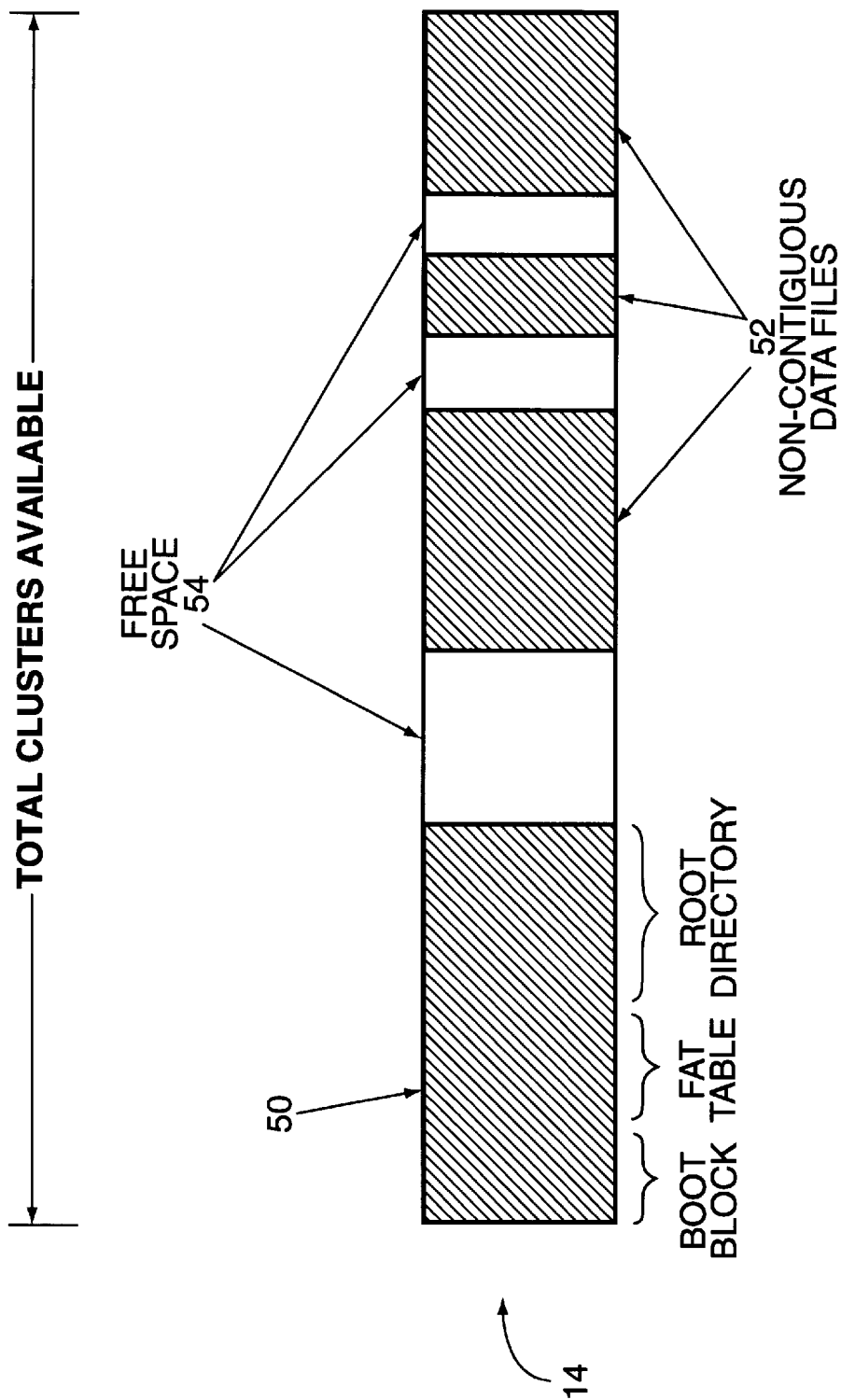
FIG. 3 is a diagram showing the physical locations of data files on a FAT hard disk, such as the hard disk shown in FIG. 1.

The physical layout of files in the FAT file system on the hard disk 14 can be pictorially represented as shown in FIG. 3. The total clusters available on the hard disk 14 are depicted in FIG. 3 with the lowest addresses to highest addresses being shown from left to right. The hatched areas 52 of FIG. 3 show the locations of files which reside on the hard disk 14, including user data and directory files. The clear areas 54 represent free space which may be allocated to new files.

The hatched area 50 contains the meta data including the boot block, FAT table 32, and root directory information for the FAT file system. The boot block, FAT table 32 and root directory information represent primary filesystem data structures or meta data which the FAT file system needs to store, maintain and access files on the hard disk 14. These data structures are generated during the format process and are placed consecutively at the lowest addresses of the hard disk 14. The boot block contains the code necessary for the computer to initialize itself upon power-up. As discussed above, the FAT table 32 contains the address information necessary to access any file on the hard disk 14, whereas the root directory is placed immediately after the FAT table so that the FAT file system can identify the beginning of the data storage area.

The preferred embodiment of the present invention described herein includes a conversion program which is designed to convert the hard disk 14 from the FAT file system described above to the OFS file system. The OFS file system also has primary filesystem data structures, such as the primary boot block and the boot block replica, which are placed at the beginning sectors of the hard disk. However, unlike the FAT file system, other OFS data structures, such as those which manage the files, can be placed anywhere on the disk.

To ensure a reliable conversion of the hard disk 14 from the FAT file system to the OFS file system, the conversion program of the preferred embodiment of the present invention checks the hard disk 14 for any errors by running the chkdsk utility. If any errors are uncovered, the conversion program is momentarily halted and the user is prompted to fix the errors on the disk before proceeding with the conversion.

After the disk has been checked for errors, the conversion program determines whether there is enough free space on the hard disk 14 to proceed with the conversion. While the program is designed to run with a minimal amount of free space, preferably there is sufficient free space on the hard disk 14 for the conversion program to run efficiently and reliably. If not, the user is prompted to backup and delete some files before continuing with the conversion.

The first substantive step in the conversion process involves compacting the FAT files. As discussed above, the FAT partition, i.e. the usable FAT sectors on the disk, is typically fragmented as shown in FIG. 3 wherein the clusters of free space are physically spaced between the clusters which contain active file data. In the preferred embodiment, a compaction utility is built into the conversion program. The compaction utility is used to remove any free space between the file data by relocating the higher addressed clusters to the lower addressed free space.

Figure 4:
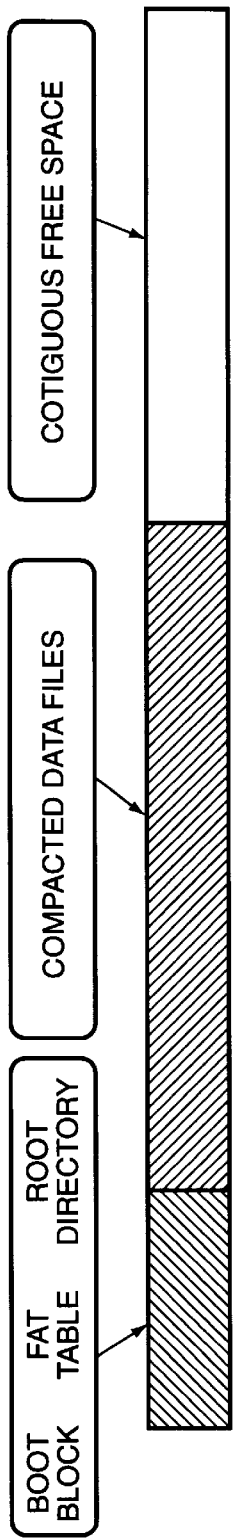
FIG. 4 is a diagram showing the hard disk of FIG. 3 after the source file system is compacted.

As shown in FIG. 4, the result of the compaction is a contiguous run of FAT meta data and compacted file data at the beginning of the FAT partition and a single run of contiguous free space at the end of the FAT partition. Although not necessary to carry out the present invention, in an alternate embodiment, full-fledged defragmenting of individual files in the FAT partition may be performed so that individual files are stored as a contiguous run of clusters on the hard disk 14. As described later, it will become apparent to those skilled in the art that defragmenting individual files would facilitate the maintenance of the FAT partition data during the conversion, particularly if additional space is needed on the hard disk 14 and the size of the FAT partition needs to be decremented. Moreover, for purposes of the preferred embodiment described herein, it is not necessary for the compacted FAT files to be physically contiguous. It is sufficient if enough data is compacted so that a run of free space is available to create the OFS files later in the conversion. Regardless, the conversion algorithm tends to create contiguous files out of non-contiguous files, thus obviating the need for a pre-compaction utility.

As described above, the preferred embodiment of the present invention uses the utilities of the target OFS file system to perform many of the conversion functions, such as creating new OFS files. Accordingly, the next step in the conversion process is to create a minimal OFS partition on the disk so that the target OFS file system can recognize it as an OFS volume with a single file.

Figure 5:
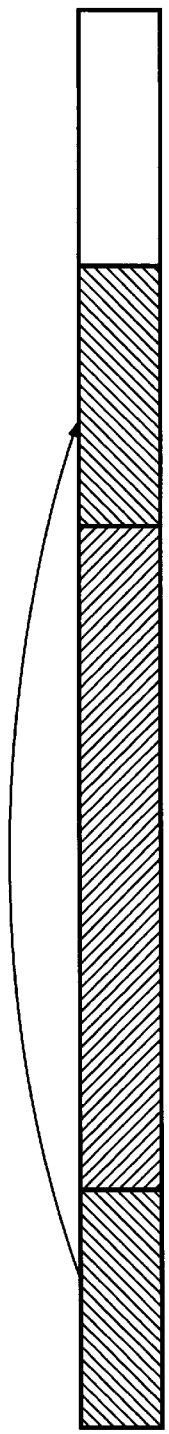
FIG. 5 is a diagram of an intermediate state of the hard disk of FIG. 4 wherein the minimal data structures of the target file system are placed on the hard disk.

To create a minimal OFS partition, the primary OFS boot block, boot block replica and other OFS data structures are created. The OFS file system expects the OFS boot block and boot block replica to reside in the first 32 sectors of the disk which currently contain all or part of the FAT meta data. Accordingly, as shown in FIG. 5, the first step of creating the minimal OFS partition is to place a copy of the first 32 sectors of the FAT partition at the end of the compacted FAT files. By copying the FAT data, the FAT structures are preserved so that in the event of an unexpected failure, such as a loss of power or the like, recovery will be possible without the loss of data.

Figure 6:
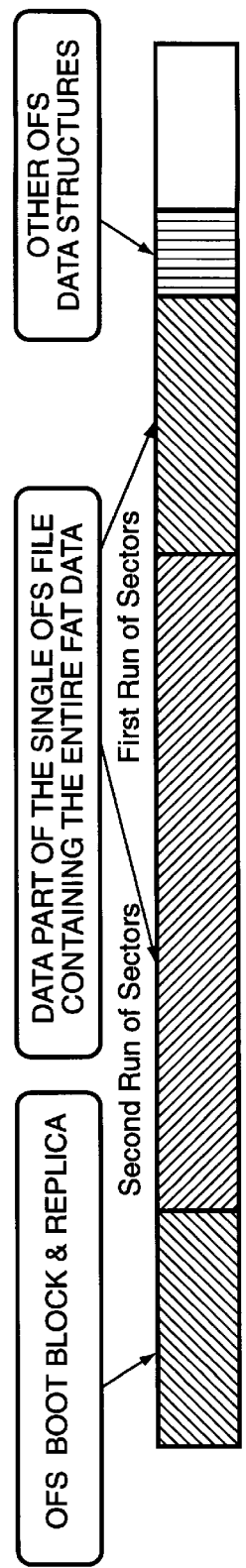
FIG. 6 is a diagram of the hard disk of FIG. 5 showing all the data on the source file system contained within a single file in the target file system.

As shown in FIG. 6, the first 32 sectors of the FAT partition are then overwritten by the primary OFS boot block and boot block replica. In addition, other OFS data structures, which may reside anywhere in memory, may be created in the free sectors immediately following the previously copied first 32 sectors of the FAT partition. One OFS data structure which is created is an Onode for the portion of the FAT partition which has active FAT meta data and files. In the preferred embodiment of the present invention, a Fat_Volume_File object is maintained which contains the entire FAT meta data and files in a single stream as two runs of sectors—the first run being the 32 copied sectors and the second run being the rest of the compacted FAT data. After the allocation map in the OFS data structures is updated and the primary FAT and backup bootblack are written, the partition table is updated to indicate that the hard disk 14 contains an OFS partition and the system is rebooted.

The minimal OFS file system is now in place which essentially contains the OFS meta data, free space which was previously considered free space of the FAT file 35 system, and one large file, the Fat_Volume_File. This minimal OFS file system is generally all that the conversion utility needs to know about the internals of the target file system in order to do the conversion, which is considerably less than the knowledge of the target file system previous conversion utilities required. All the FAT data (meta data and file data) is available as a single large stream inside the Fat_Volume_File. To perform the conversion, the conversion program successively parses out the data of individual files contained in the Fat_Volume_File and provides the data associated with an individual file to the OFS file system with the instruction to create a new file containing this data in the OFS file system. If necessary to free up additional space in the OFS file system, as new files are created in the OFS file system, the data in the Fat_Volume_File associated with the new OFS files can be deleted and the size of Fat_Volume_File updated.

To simplify the process of updating the Fat_Volume_File and to increase the likelihood that the OFS file system will be fully defragmented at the end of the process, one embodiment of the present invention parses the data from the end of the Fat_Volume_File and further compacts the Fat_Volume_File when necessary. As a result, the final step of updating the Fat_Volume_File comprises providing the OFS file system with a command to change the size of the Fat_Volume_File to correspond to the size of the remaining data stored therein. Finally, after the file data has been parsed from the Fat_Volume_File, the Fat_Volume_File object, which essentially contains only FAT meta data, is also deleted.

Figure 7:
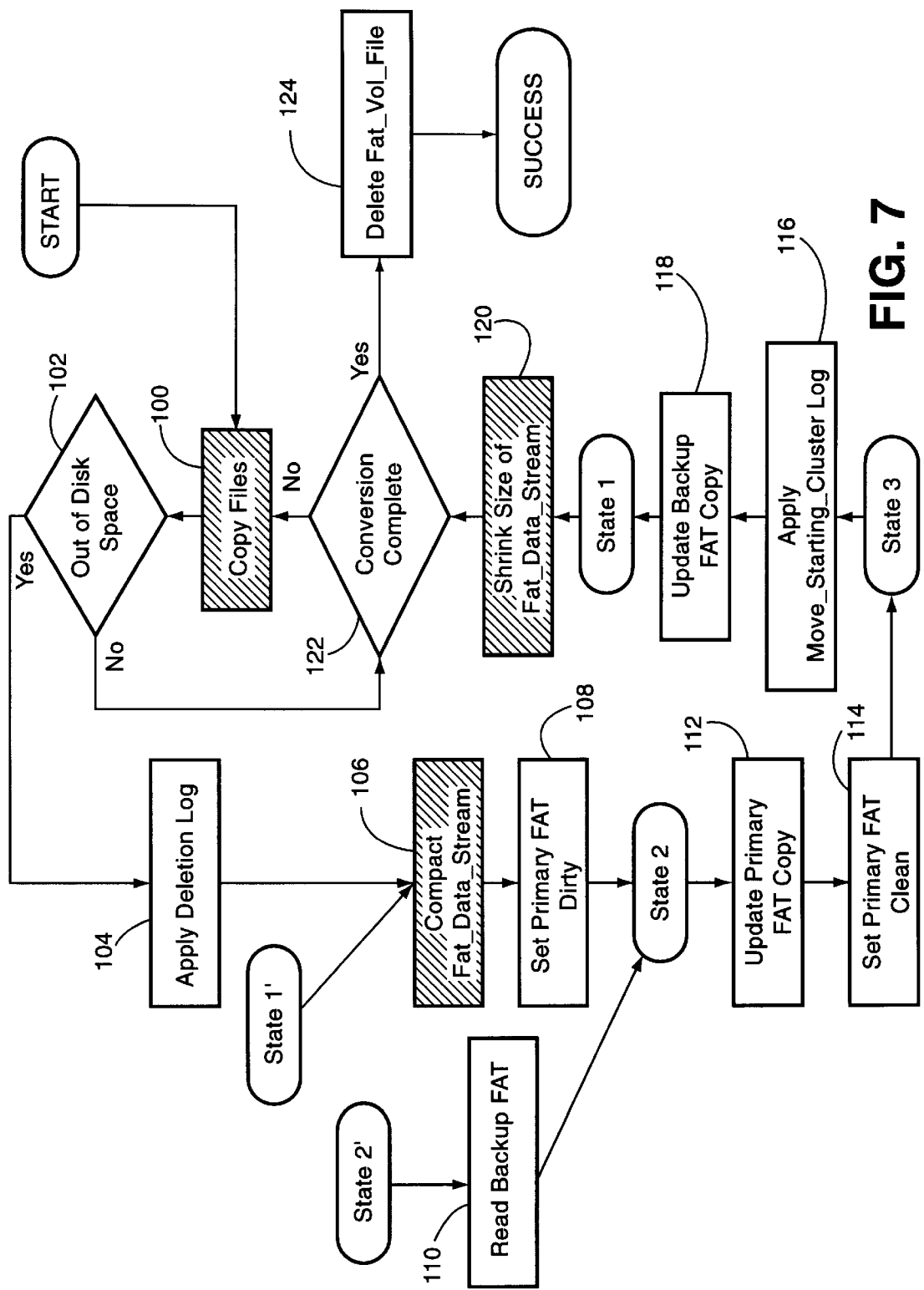
FIG. 7 is a flow chart setting forth the steps performed to convert files in the source file system to files in the target file system.

A flow chart detailing the steps described above to convert the Fat_Volume_File data to OFS files using the preferred embodiment of the present invention is set forth in FIG. 7. FIG. 7 describes a state machine wherein ellipses represent a particular state, rectangles represent actions and diamonds represent decisional blocks. As will be described hereinafter, the gray shaded rectangles represent actions which do not update any of the on-disk FAT meta data structures; instead, in these actions, only in-memory changes to FAT meta data structures are affected.

An important feature of the present invention includes the ability to recover from an error at any point in the conversion process without losing any of the data on disk. As shown in the state machine diagram of FIG. 7, the present invention provides for error recovery during the copying of files from the source file system to the target file system, during the deletion of files on the source file system, during the compacting of the source file system and at all other points during the conversion process.

After the minimal OFS file system has been created, the conversion program proceeds at step 100 to begin copying files from the Fat_Volume_File to the OFS file system. To enable the present invention to operate with only a minimum amount of free space available, the conversion program maintains a deletion log of the clusters associated with data of the FAT files stored in the Fat_Volume_File which have been successfully converted into OFS files. If necessary, the deletion log will be used to free up additional space for the OFS file system. The preferred embodiment of the present invention uses this in-memory deletion log instead of making changes to the FAT meta data on disk after every deletion in order to reduce the input/output costs associated with writing to the hard disk 14. The deletion log may also assist in recovery if an error occurs while copying files at step 100.

The copying of all the data from the Fat_Volume_File to the OFS file system at step 100 includes the copying of the files and the directory structure of the FAT file system. In the FAT system, there is a clear distinction between the root directory and non-root directories. Non-root directories are implemented as files and can be created and deleted; on the other hand, the root directory always exists. As such, the conversion program has separate structures to copy both the root directory and the non-root directories from the Fat_Volume_File to the OFS file system. The conversion program is capable of creating files and directories in the OFS file system with the same names and attributes as the directories and files in the FAT file system.

The conversion proceeds until completed unless it is determined at step 102 that the hard disk 14 has run out of available space. If so, the conversion program applies the deletion log described above to the Fat_Volume_File, as shown at step 104, to determine which clusters are now available for compaction. If an error occurs and the deletion log is lost before it has been applied, the conversion program simply starts over at step 100 and attempts to convert files since the last application of the deletion log. The OFS file system keeps track of its files and the conversion program will not create duplicate files of the same name and size.

After applying the deletion log, the Fat_Volume_File is compacted at step 106 using the compaction routine of the present invention. The compaction routine reduces the size of the data stream within the Fat_Volume_File by copying the data in active clusters located at the end of the data stream to inactive clusters whose data has already been copied to the OFS file system. After compaction, the clusters at the end of the Fat_Volume_File will contain inactive or redundant information which may later be freed (at step 120) to be used by the OFS file system.

To assist the compaction routine, two specialized data structures are used. First, the routine defines whether a cluster is reachable or unreachable. Any cluster that can be reached by traversing through the FAT directory tree and following the cluster chain links is considered to be reachable. Conversely, a cluster which cannot be reached in this manner is defined as unreachable. Since it is assumed that the conversion successfully commenced with a consistent FAT cluster chain where all in-use clusters were reachable, any cluster that becomes unreachable is treated as becoming unreachable due to the manipulations of the compaction routine. Thus, instead of marking the clusters FREE by setting the cluster map to EOF, the compaction routine sets the cluster variable to unreachable as an indication that the space on disk can later be used by OFS. As will be described in further detail below, maintaining a linked list of unreachable clusters assists in the recovery from failure at any point in the algorithm.

The second data structure is an in-memory data structure used by the compaction routine to maintain a Reverse FAT Table. As described above, clusters are linked together in a chain to define a FAT file. Using the FAT table, the preceding cluster provides a pointer to the next cluster in the chain. When data is moved from one cluster to another, its preceding node is updated to point to the correct cluster. In order to speed up the updating process, the Reverse FAT table is created. This specialized data structure is similar to the FAT table except a given cluster location in the FAT table points to the previous cluster, not the next cluster, in the chain.

The Reverse FAT table is constructed from the FAT table at the beginning of the conversion process. Each node to directory tree and the files therein is constructed from the FAT. As discussed above, any cluster that is not reachable is marked as FREE. In this manner, the present invention maintains sufficient information about the FAT file system to be able to reconstruct the original file system should there be a failure.

For restartability and recovery, the compaction routine at step 106 maintains a Move_Starting_Cluster log which keeps track of changes that the compaction routine makes to the starting cluster of any files or directories. When the compaction algorithm moves data from one cluster to another, the cluster links in the in-memory copy of the FAT table as well as the Reverse FAT table are updated. The old links are preserved to recover from failure, as described subsequently. Further, the data which is compacted is copied so that the same data exists in both the old and the new clusters, and data can be recovered if an error occurs before the space is provided to the OFS file system.

After the Fat_Volume_File has been compacted at step 106, the primary FAT table, which technically is still valid because data has only been copied, is updated to reflect the new data chain links so that the copied data at the end of the Fat_Volume_File can then be freed for use by the OFS file system. Before updating the primary FAT table, the primary FAT table is marked as dirty at step 108, thereby entering the conversion program into state 2. As shown in the state machine diagram of FIG. 7, state 2 represents one of three possible states with respect to the synchronization of the primary FAT table and the backup FAT table: State 2 is characterized as the state where the primary FAT table is dirty; State 1 is a fully consistent state in which the primary FAT table is synchronized with the backup FAT table and the directory data is also up to date; and state 3 is the state where the primary FAT table is clean but is not synchronized with the backup FAT table. States 1' and 2' are states which have the same characteristics of states 1 and 2, respectively. However, states 1' and 2' represent starting states that are only entered if the conversion program has been temporarily interrupted.

Marking the primary FAT table as dirty at step 108 helps to avoid the loss of data by serving as a flag that the primary FAT table is in the process of being updated and may no longer be reliable. For example, if the system crashed while in state 2, the conversion system upon rebooting would recognize that the primary FAT table is dirty and begin in starting state 2'. After entering state 2', the conversion program will read the backup FAT table into the primary FAT table and mark the primary FAT table as dirty at step 110. The conversion program then enters state 2, thereby recovering from the system crash.

At step 112, the Primary FAT table is updated to reflect the new data chain links that were created by the compaction routine at step 106. The FAT table is then marked clean to signify that the primary FAT table is current and reliable (step 114). The conversion program then enters state 3 as described above.

Now that the primary FAT table has been updated, the conversion program at step 116 applies the Move_Starting_Cluster log (which was created during the compaction routine at step 106) to update the directory entry information for any files or directories whose starting cluster was changed. Due to unexpected system failures, it may not be possible to guarantee that the update of the primary FAT table (step 112) occurs atomically with the update of the directory entry information (step 116). Therefore, the conversion program first flushes the update of the directory information to the disk at step 116 before it updates the backup FAT table at step 118. In this manner, the backup FAT table may be used to access the data, if necessary, prior to step 116.

After the primary FAT table, backup FAT table and directory information have been updated, the conversion program enters state 1 and directs the OFS file system at step 120 to decrease the size of the Fat_Volume_File, thereby freeing up additional space in the OFS file system. If the conversion has not been completed (step 122), the conversion program returns to step 100 to continue converting files from the FAT file system to the OFS file system, thereby starting the cycle over again. When all the data files in the Fat_Volume_File have been converted to OFS files, the conversion is completed and the conversion program deletes what remains of the Fat_Volume_File at step 124.

As referred to throughout, a feature of the embodiment of the present invention includes the ability to recover from a failure at any point during the conversion without the loss of data. In summary, the update protocols which help to maximize the recoverability from error are as follows: 1) the data in the FAT clusters are copied so at least one copy of the data is always available, and moreover, two copies of the data are available until the corresponding entry has been deleted in the FAT; 2) file data is flushed to the disk before any FAT meta data changes are flushed; 3) at any point during the conversion, there is at least one copy of the FAT which is consistent, clean and correct; and 4) all FAT table updates are flushed to the disk before any directory entry updates are flushed to the disk.

Figure 8A:
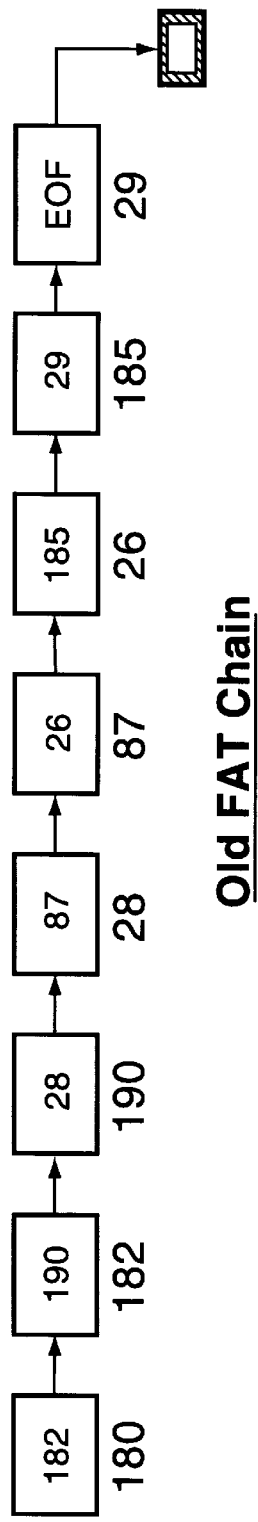
FIG. 8a is a block diagram showing an old FAT chain for a file prior to compacting the clusters of the file.
Figure 8B:
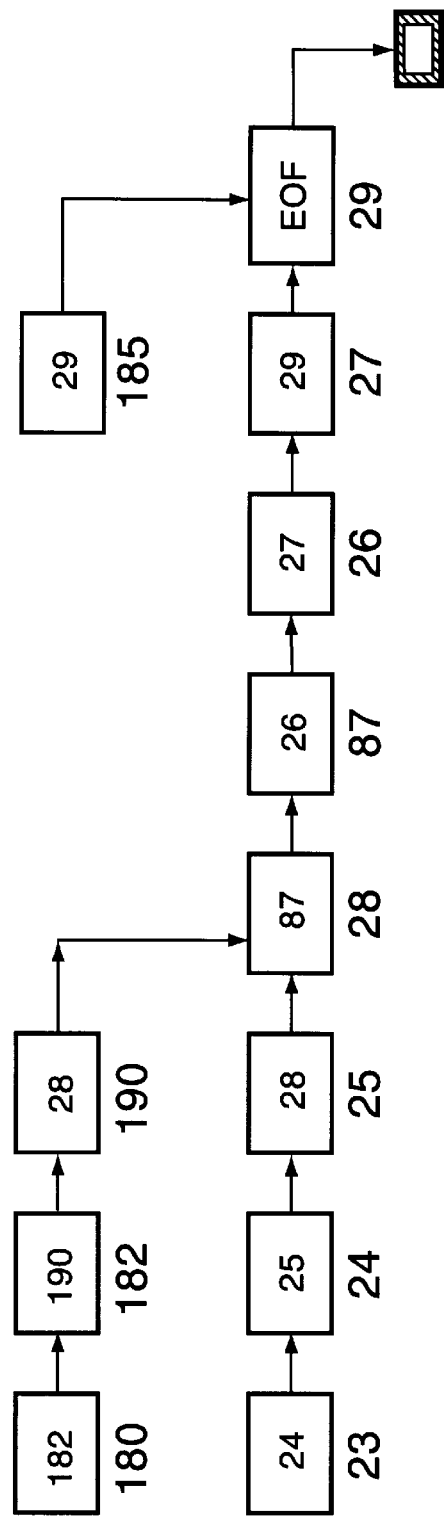
FIG. 8b is a block diagram showing a new FAT chain for a file after clusters in the file have been copied to earlier clusters on the hard disk.

The specific protocol involved in flushing the FAT tables and directory information to the disk helps to recover from errors at any stage of the compaction routine. For example, FIG. 8a shows an old FAT chain for a file A which begins with 180 as the starting cluster. Starting cluster 180 points to the next cluster 182 which points to the subsequent cluster 190. Each successive cluster points to the next cluster until the final cluster 29 points to EOF. FIG. 8b shows the new FAT chain which is created in the case where compaction of all clusters greater than cluster 100 has occurred. The data in clusters 180, 182, 190 and 185 has been moved to clusters 23, 24, 25 and 27, respectively, and the new FAT chain has been updated accordingly. The new FAT chain begins at cluster 23 and points to the next cluster 24 which points to a subsequent cluster 25. Each successive cluster points to the next cluster until the final cluster 29 again points to EOF. The result is that file A may be accessed through either the old FAT chain or the new FAT chain or both. This is possible since the conversion program copies the data to the new clusters and does not delete or overwrite the old clusters until the directory update is flushed to the disk.

If a failure occurs before the primary FAT table is flushed (state 2), the old FAT chain on the disk is used and file A is accessed starting at cluster 180 and continuing through clusters 182, 190, 28, 87, 26, 185 and 29. If a failure occurs in between the primary FAT table update and the directory update (state 3), the directory information has not been updated and still contains cluster 180 as the starting cluster for file A. In such a case, the new FAT chain is used to access file A starting again at cluster 180 but continuing through clusters 182, 190, 28, 87, 26, 27 and 29. If a failure occurs after the directory data is flushed, file A can be accessed through the new FAT chain starting at cluster 23 and continuing through clusters 24, 25, 28, 87, 26, 27 and 29. Therefore, the program can recover the file in all cases.

Directory files are similarly updated. The data belonging to a directory file is also copied and not overwritten. This will guarantee that the conversion program will be able to access the full tree below a directory after moving its starting cluster even if a failure occurs. With respect to a starting cluster of a directory file, after the starting cluster is updated in the in-memory data structures, any updates belonging to that directory are made to the new cluster chain of that directory file and not to the old cluster chain.

For example, FIGS. 9a and 9b show the case of a compaction where clusters associated with directory files A, B, and C which were numbered above 100 are moved to free clusters before 100. As a result of this, the new starting cluster for directories A, B and C are 59, 65 and 66, respectively. In modifying the inner links, the starting cluster of B is changed to 65 in the new cluster of A (i.e. cluster 59 and not cluster 180). Similarly, the starting cluster of C is changed to 66 in B's new cluster (cluster 65).

An alternative embodiment of the present invention includes the ability to convert files from one file system to another without copying the file to the target file system. With knowledge of the source file system, the conversion program can parse out the files in the Fat_Volume_File and identify the location and size of the files. Instead of providing the data to the target file system to copy into a new target system file, the conversion program provides the location and size information to the target file system and instructs the target file system to create a new file of the same size on the target file system at the same location. In such a case, the target file system creates pointers to the data which are contained within the Fat_Volume_File.

With this alternative embodiment, there is no need to free-up space while running the conversion program since the files are not being copied. As such, a compaction routine which can shrink the size of the Fat_Volume_File is unnecessary. Of course, the target file system or the conversion program needs to provide support for creating such sparse files (i.e. files that are not physically contiguous on the disk).

In the OFS file system, if a file is physically contiguous, then only one pointer is required and the length associated with the pointer equals the file length. However, if a file is not physically contiguous, the OFS file system provides for multiple pointers to the file, with each pointer having a variable length associated with it.

An additional step of defragmenting either before or after the conversion is recommended but not necessary since the present invention does not require a full defragmenting of the files. In addition, since the Fat_Volume_File is deleted at the end of the conversion, the present invention allows for reconverting back to the source file system in the event of an unrecoverable error during conversion. In the event of an error, the FAT file system can be reestablished by restoring the boot sectors from the source file system.

As can be seen from the foregoing detailed description, there is provided a method and system for efficiently converting data from a source file system to a target file system. The present invention simplifies the programming necessary for converting a disk from a source file system to a target file system. The method and system converts a disk from a source file system to a target file system without requiring the backing up of the source file system on an auxiliary peripheral storage device and without requiring a large amount of available free space on the disk. The files are converted from a source file system to a target file system while maintaining data integrity and while providing the ability to recover from errors at any stage in the conversion process.

The foregoing description of preferred embodiments of the invention has been presented for purposes of illustration and description. They are not intended to be exhaustive or to limit the invention to the precise form disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated.

What is claimed is:

1. A computer-readable medium having computer-executable instructions for performing steps for converting a source file system containing meta data and data files to a target file system while maintaining the data integrity of the data files, the steps comprising:

creating target file system meta information;

saving the data files and meta data of the source file system in one or more target files in the target file system;

parsing data associated with files of the source file system out of the one or more target files; and providing the parsed data to the target file system with instructions to the target file system to save the parsed data as files in the target file system.

2. The computer-readable medium of claim 1, wherein the target file system meta information is placed in the free space of the source file system.

3. The computer-readable medium of claim 1, further comprising the step of compacting the data files on the source file system prior to the step of saving the data files and meta data of the source file system in one or more target files in the target file system.

4. The computer-readable medium of claim 1, further comprising the step of compacting the one or more target files during the conversion to free additional space in the target file system.

5. The computer-readable medium of claim 1, wherein the instructions to the target file system to save the parsed data as files in the target file system includes the instructions to create new target files using the parsed data.

6. The computer-readable medium of claim 1, wherein the instructions to the target file system to save the parsed data as files in the target file system includes the instruction to create pointers to the parsed data located within the one or more target files, thereby obviating the need to copy the data from the one or more target files to a new target file.

7. The computer-readable medium of claim 6, wherein the pointers in the target file system are created based on the file location and file size of the file associated with the parsed data.

8. The computer-readable medium of claim 1, wherein the instructions to the target file system comprise target file system calls.

9. A computer-readable medium having computer-executable instructions for performing steps for converting a source file system containing meta data and data files to a target file system while maintaining the data integrity of the data files, the steps comprising:

creating target file system meta information;

creating a file in the target file system, the file corresponding to data of the source file system, by using calls in the target file system to copy the data of the source file system to the target file system; and using a primary copy and a backup copy of the source file system meta information for error prevention.

10. The computer-readable medium of claim 9, wherein the primary copy is updated as the data of the source file system is copied to the target file system.

11. The computer-readable medium of claim 10, wherein the backup copy is used in the event of a failure while updating the primary copy.

12. A computer-readable medium having computer-executable instructions for performing steps for converting a source file system containing meta data and data files to a target file system while maintaining the data integrity of the data files, the steps comprising:

creating target file system meta information;

executing commands of the target file system to convert the source file system to the target file system; and deleting source file system meta information.

13. The computer-readable medium of claim 12, wherein the target file system commands include creating files in the target file system using the data from the source file system.

14. The computer-readable medium of claim 13, wherein the data from the source file system is copied and then saved by the target file system.

15. The computer-readable medium of claim 13, wherein the location of the data from the source file system is provided to the target file system to update the target file system meta information.

16. A computer-readable medium having computer-executable instructions for a file conversion utility for converting a source file system containing meta data and data files to a target file system while maintaining the data integrity of the data files, said file conversion utility comprising:

means for creating target file system meta information;

means for saving the data files and meta data of the source file system in one or more target files in the target file system;

means for parsing data associated with files of the source file system out of the one or more target files; and means for providing the parsed data to the target file system with instructions to the target file system to save the parsed data as files in target file system.

17. A computer-readable medium having stored thereon a data structure for rendering a target file system, comprising:

a target file system field containing meta data corresponding to the target file system; and a source to target file system file in the target file system format containing source file system file data from which the contents of multiple source file system files are parsed and saved as target file system files.

18. The computer-readable medium of claim 17, further comprising an instruction data field containing computer-executable instructions for creating corresponding target file system files containing the contents of the parsed source to target file system file.

* * * * *

UNITED STATES PATENT AND TRADEMARK OFFICE
CERTIFICATE OF CORRECTION

PATENT NO. : 5,983,240
DATED : November 9, 1999
INVENTOR(S) : Srikanth Shoroff; Bartosz Boleslaw Milewski It is certified that errors appear in the above-identified patent and that said Letters Patent is hereby corrected as shown below:

In Column 3, line 20: "Less" should read --less--

In Column 6, line 7: "bootblack" should read --bootblock--

Signed and Sealed this

Fifth Day of December, 2000

Attest:

Q. TODD DICKINSON

*Attesting Officer*  *Director of Patents and Trademarks*